(12) United States Patent
Busacca et al.

(10) Patent No.: US 7,848,848 B2
(45) Date of Patent: Dec. 7, 2010

(54) ROBOTIC STATION FOR CAPTURING BOTH IMAGE AND WEIGHT OF A SAMPLE

(75) Inventors: Robert S. Busacca, Geneva (CH); Jeff Maag, Belmont, CA (US); William H. Chandler, Jr., Milpitas, CA (US); Eric D. Carlson, Cupertino, CA (US)

(73) Assignee: Freeslate, Inc., Sunnyvale, CA (US)

( * ) Notice: Subject to any disclaimer, the term of this patent is extended or adjusted under 35 U.S.C. 154(b) by 642 days.

(21) Appl. No.: 11/796,363

(22) Filed: Apr. 27, 2007

(65) Prior Publication Data
US 2007/0255455 A1   Nov. 1, 2007

Related U.S. Application Data

(60) Provisional application No. 60/795,788, filed on Apr. 28, 2006.

(51) Int. Cl.
*G06F 19/00* (2006.01)
*G05B 19/04* (2006.01)

(52) U.S. Cl. .................. 700/249; 382/128; 700/245
(58) Field of Classification Search ............... 700/249
See application file for complete search history.

(56) References Cited

U.S. PATENT DOCUMENTS

| | | | | |
|---|---|---|---|---|
| 4,738,825 A | * | 4/1988 | Kelln et al. ............... 422/72 |
| 4,835,707 A | * | 5/1989 | Amano et al. ............. 700/266 |
| 5,122,342 A | * | 6/1992 | McCulloch et al. ......... 422/65 |
| 5,125,748 A | * | 6/1992 | Bjornson et al. ........... 356/414 |
| 5,154,246 A | * | 10/1992 | DiGiulio et al. .......... 177/25.15 |
| 5,574,801 A | * | 11/1996 | Collet-Beillon ........... 382/150 |
| 5,578,270 A | * | 11/1996 | Reichler et al. ............ 422/67 |
| 5,762,881 A | * | 6/1998 | Harness et al. ............ 422/132 |
| 5,921,459 A | * | 7/1999 | Heraly et al. .............. 228/45 |
| 6,045,755 A | * | 4/2000 | Lebl et al. ................. 506/33 |
| 6,060,022 A | * | 5/2000 | Pang et al. ................. 422/65 |
| 6,086,831 A | * | 7/2000 | Harness et al. ............ 422/199 |
| 6,132,686 A | * | 10/2000 | Gallup et al. .............. 422/130 |
| 6,259,654 B1 | * | 7/2001 | de la Huerga ............. 368/10 |
| 6,319,469 B1 | * | 11/2001 | Mian et al. ................ 422/64 |

(Continued)

FOREIGN PATENT DOCUMENTS

WO    WO 98/40159    9/1998

OTHER PUBLICATIONS

Boussie et al., J. Am. Chem. Soc., 2003, 125, pp. 4306-4317.

(Continued)

*Primary Examiner*—Khoi Tran
*Assistant Examiner*—Kyung J Kim
(74) *Attorney, Agent, or Firm*—Senniger Powers LLP

(57) ABSTRACT

A robotic system with a common software and hardware platform for integration of a variety of modular components is provided that can be set up for a given application and reconfigured to address changing needs. Modules attach to the robotic platform with standard interfaces in order to maximize the platform's flexibility. Robotic arms also have interchangeability such as variable pitched Z-racks, powder handling or other technologies. The standard interfaces allow third party developers to develop and integrate their own custom modules. One module included with the robotic platform in accord with this invention is a module that both weighs and images a sample.

25 Claims, 6 Drawing Sheets

U.S. PATENT DOCUMENTS

| | | | |
|---|---|---|---|
| 6,673,316 B1* | 1/2004 | Okamoto et al. | 422/63 |
| 6,707,381 B1* | 3/2004 | Maloney | 340/568.1 |
| 6,759,041 B1* | 7/2004 | Yatomi | 424/130.1 |
| 6,827,904 B2* | 12/2004 | Kitagawa | 422/100 |
| 6,900,941 B2* | 5/2005 | Kaminsky et al. | 359/599 |
| 6,932,943 B1* | 8/2005 | Cracauer et al. | 422/130 |
| 7,070,740 B1* | 7/2006 | Matson et al. | 422/104 |
| 7,136,539 B2* | 11/2006 | Weyl | 382/280 |
| 2001/0045358 A1* | 11/2001 | Kopf-Sill et al. | 204/452 |
| 2003/0021454 A1* | 1/2003 | Weyl | 382/128 |
| 2005/0121592 A1* | 6/2005 | Van Der Ven et al. | 248/637 |
| 2006/0166801 A1* | 7/2006 | Takahashi | 494/12 |
| 2006/0259195 A1* | 11/2006 | Eliuk et al. | 700/245 |

OTHER PUBLICATIONS

Bazan et al., J. Am. Chem. Soc., 2002, 124, pp. 15280-15285.

Desrosiers et al., "An Integrated High Throughput Workflow For Pre-Formulations: Polymorph And Salt Selection Studies," PharmaChem, Jul./Aug. 2003, pp. 10-15.

Gardner et al., "Application of High Throughput Technologies To Drug Substance And Drug Product Development," Computers And Chemical Engineering 28, 2004, pp. 943-953.

Van Loo et al., "Automated Workstations For Parallel Synthesis," Organic Process Research & Development, 2002, 6, pp. 833-840.

Boussie et al., "Parallel Solid-Phase Synthesis, Screening, and Encoding Strategies For Olefin-Polymerization Catalysts," Tetrahedron 55, 1999, pp. 11699-11710.

Higginson et al., "An Automated Approach to Process Optimisation, Parameter Setting, and Robustness Testing," Organic Process Research & Development, 2001, 5, pp. 331-334.

Mettler Toledo, Bohdan Balance AutomatorTM Round-The-Clock Weighing Station, Brochure, 2003, 4 pages.

Mettler Toledo, AutoChem Balance Automator(R) US List Price Catalog, Catalog, 2004, 15 pages.

Mettler Toledo, AutoChem Automator Operations Manual, Manual, 2003, 140 pages.

* cited by examiner

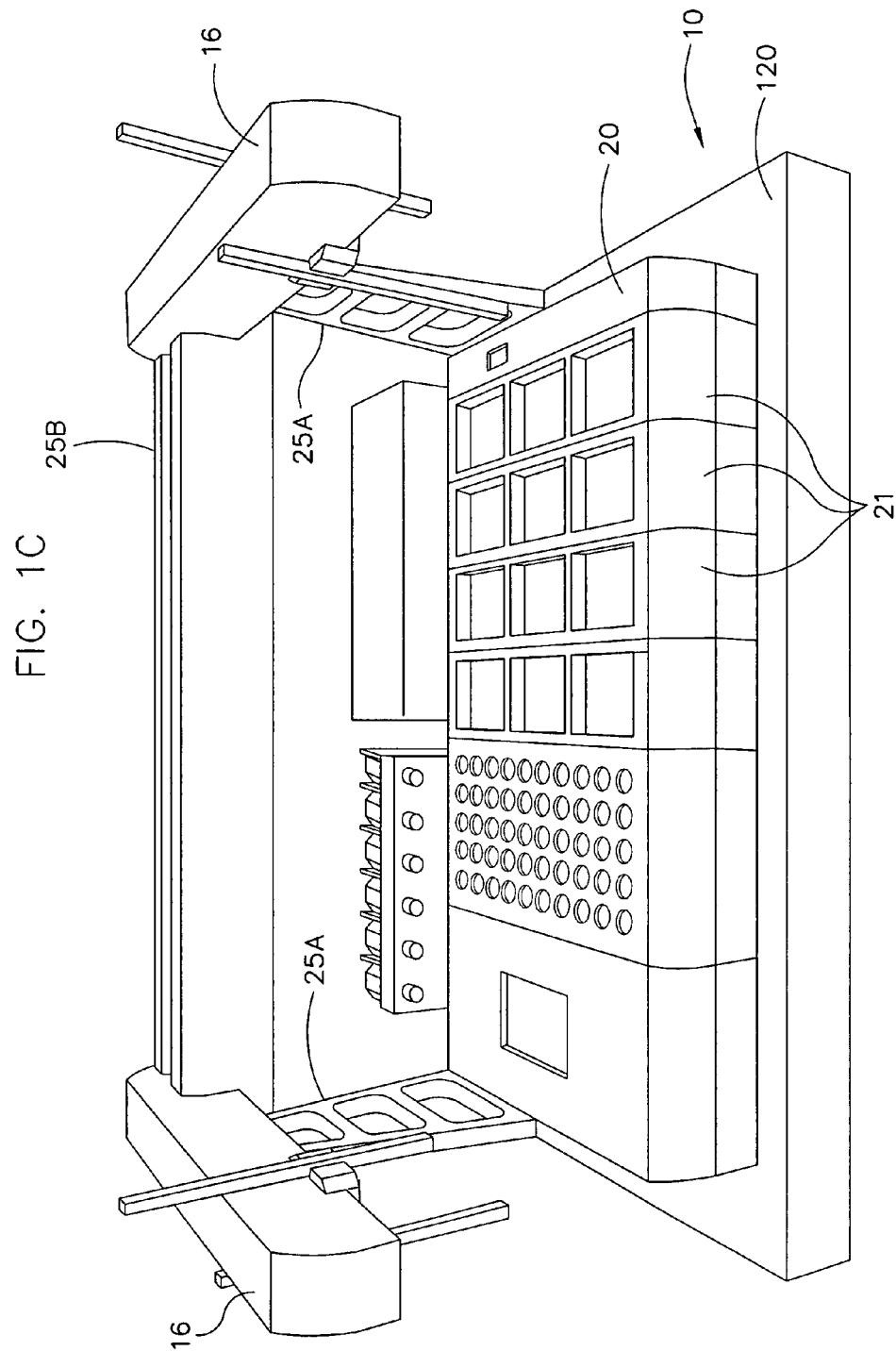

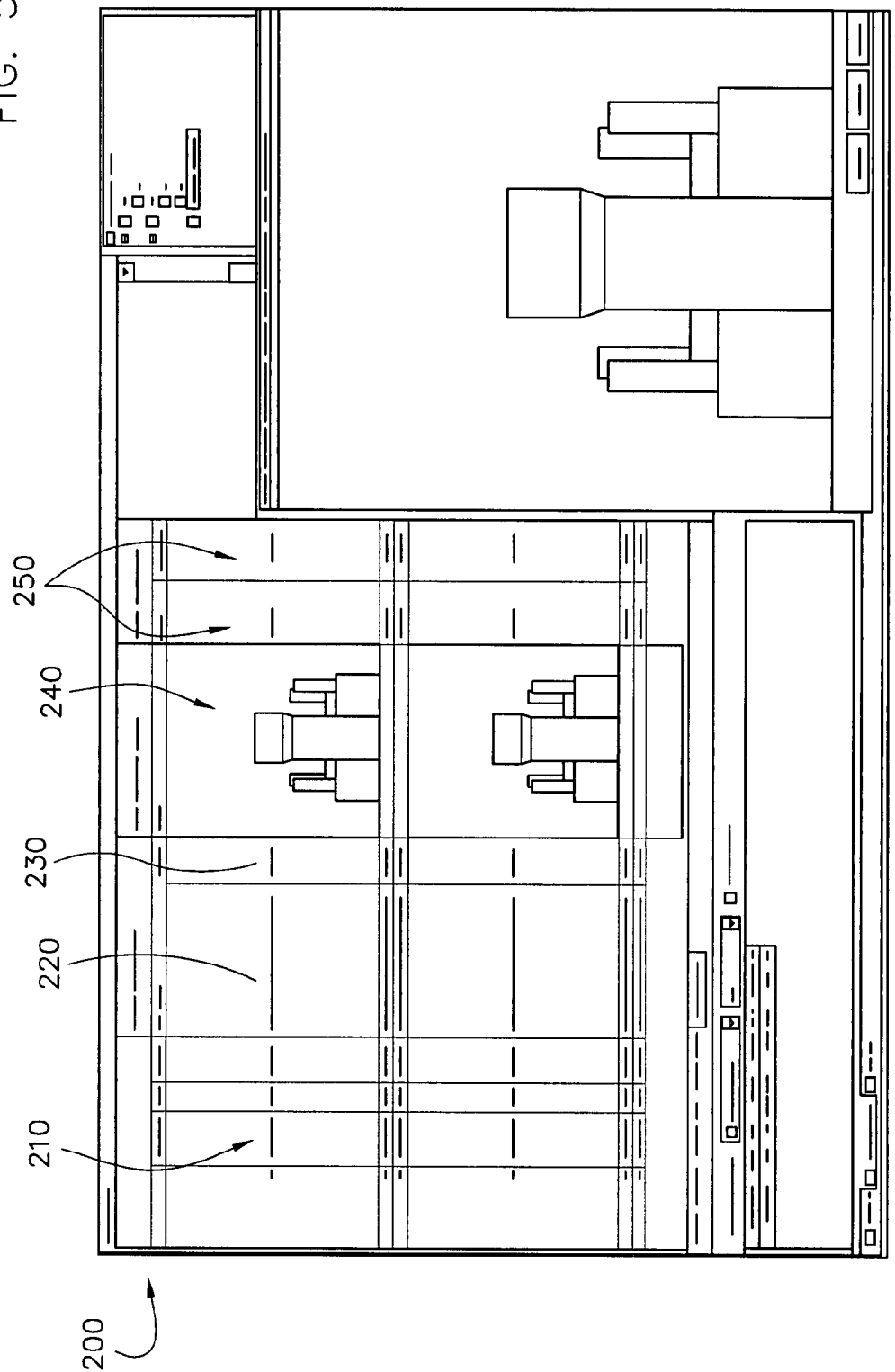

ROBOTIC STATION FOR CAPTURING BOTH IMAGE AND WEIGHT OF A SAMPLE

CLAIM OF PRIORITY

This application claims the benefit of U.S. Provisional Application No. 60/795,788 filed on Apr. 28, 2006, which is incorporated herein by reference for all purposes.

FIELD OF THE INVENTION

This invention relates to a modular robotic workstation capable of performing a multitude of functions, with the workstation including a module having the capability of both weighing and capturing the image of a sample. The robotic workstation has a modular design, meaning a plurality of modules can be plugged into the workstation to create different configurations, as desired.

BACKGROUND

Automation is well established within the pharmaceutical discovery research departments. Over the past several years, there have been efforts to apply automation and high throughput techniques into various development labs in which automated systems have been set up to serve dedicated workflows. For example, there are a number of automated reactor systems that have been used for synthesis screening and process optimization. See, for example *J. Am. Chem. Soc.* 2003, 125, 4306-4317; "An Automated Approach to Process Optimization, Parameter Setting, and Robustness Testing" Organic Process R&D 2001, 5, 331-334; *J. Am. Chem. Soc.* 2002, 124, 15280-15285; "Automated Workstations for Parallel Synthesis" *Organic Process R&D* 2002, 6, 833-840; "Parallel solid-phase synthesis, screening, and encoding strategies for olefin-polymerization catalysts." *Tetrahedron* 1999, 55(39), 11699-11710; "An integrated high-throughput workflow for pre-formulations: Polymorphs and salt selection studies" *Pharmachem*, 2003, 1(7/8); and "Application of high throughput technologies to drug substance and drug product development" *Computers and Chem. Eng.* 2004, 28, 943-953.

While these examples highlight that automation has been successfully applied to dedicated workflows, there is a need for more flexible automation systems. Others have proposed robotic systems having interchangeable parts, including robotic arms, reaction vessels and reaction vessel arrays. See, e.g., WO 98/40159. These systems have proven too complex to be easily customizable for application to a variety of chemical workflows.

In addition, others have produced automated weighing systems, such as the Balance Automator from Mettler Toledo, Inc. This system however performs only one function (automated sample weighing) and is not modular.

SUMMARY

The invention provides apparatus and systems that comprise a robotic platform with a common software and hardware platform for integration of a variety of modular components that can be set up for a given application and reconfigured to address changing needs. Modules attach to the robotic platform with standard interfaces in order to maximize the platform's flexibility. Robotic arms also have standard interfaces for interchangeability such as variable pitched Z-racks, powder handling or other technologies. Optionally, a third robotic arm can be added. The standard interfaces allow third party developers to develop and integrate their own custom modules. One module included with the robotic platform in accord with this invention is a module that both weighs and images a sample.

The details of embodiments of the invention are set forth in the accompanying claims, drawings and description, below. Other features, objects, and benefits of the invention will be apparent from the description and drawings.

DESCRIPTION OF DRAWINGS

FIG. 1B is a perspective drawing of the robot system with the weighing and imaging module removed and FIG. 1C is another drawing of the robot platform.

FIG. 5 is a screen shot of the software showing the results of the weighing and imaging module.

DETAILED DESCRIPTION

Figure 1A:
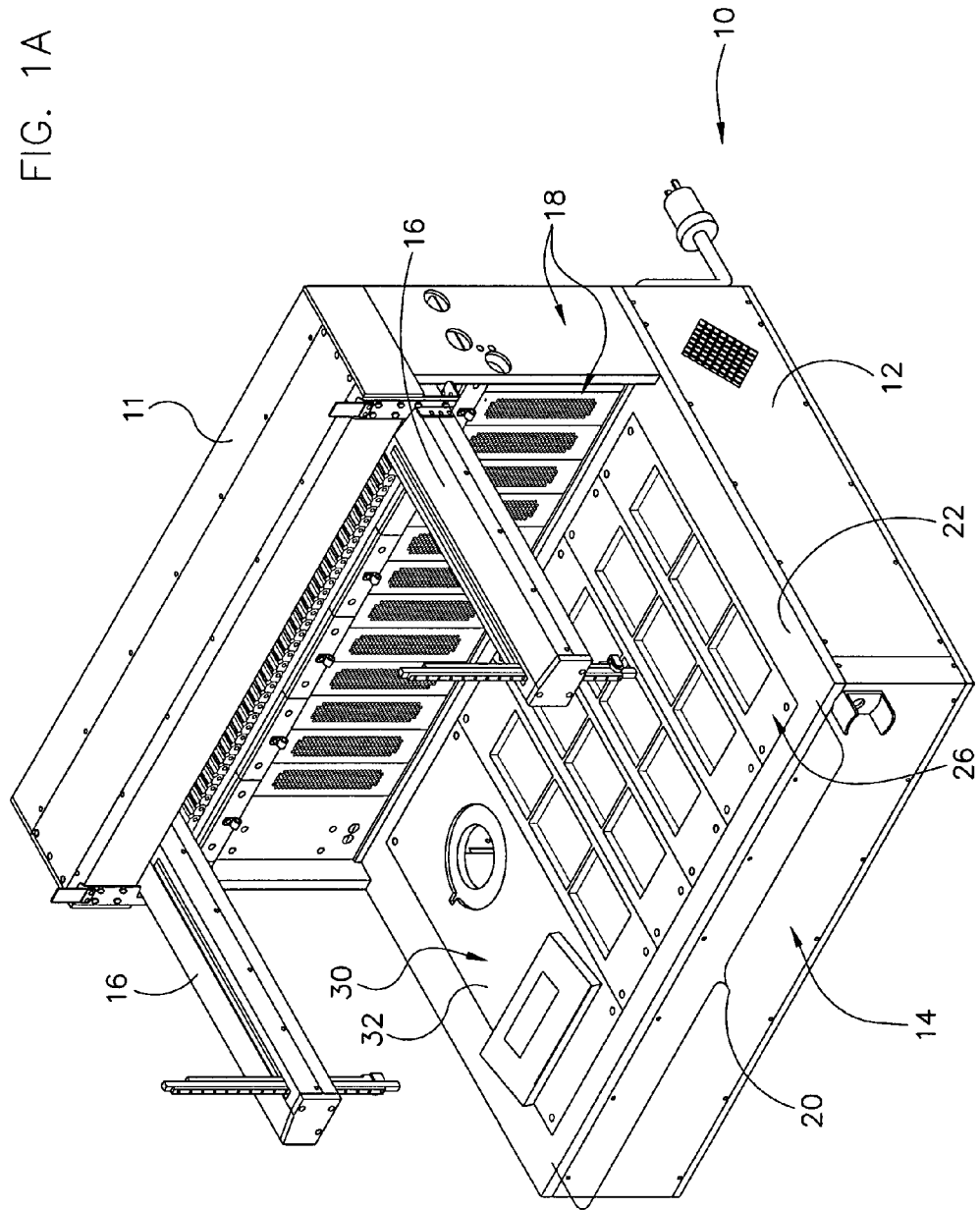
FIG. 1A is a perspective drawing of the robot platform including a weighing and imaging module.

In the present invention, systems and apparatus comprise a configurable three axis Cartesian robot, pump housing, and deck which can be outfitted with various functional modules. This configurable architecture allows users to customize the hardware for specific workflows by adding the appropriate modules to the basic robot platform. This robot system further comprises additional functionality selected from the group consisting of parallel overhead stirring, viscous dispense tips, friction/force probes, high temperature dispense tips, vial grippers, plate grippers, pH probes, and a variety of configurable deck modules including a balance for feedback control of viscous materials dispensing, heating/cooling/stirring zones, vortexing zones, and a sample imaging station. Robot configurations range from a simple general purpose liquid handling robot to a configuration that also includes the sample processing and analytical capabilities required for a complex workflow.

Modules attach with standard interfaces in order to maximize the platform's flexibility. Robotic arms also have standard interfaces for interchangeability such as variable pitched Z-racks, powder handling or other technologies. There are typically two robotic arms, and optionally, a third robotic arm can be added. The standard interfaces allow third party developers to develop and integrate their own custom modules.

One embodiment of the invention includes a robotic system, comprising: a) a frame optionally comprising a backplane, front, and sides. The frame can form a deck outline adapted to receive a plurality of modules associated with the frame. The frame can also comprise a base adapted to receive a plurality of modules, with the modules having top plates that combine to form a work surface. The arms of the robotic system are supported by the backplane or a framework extending from the base. The robotic system also comprises, b) a plurality of interfaces associated with the frame, wherein at least two of said interfaces are identical to one another and c) a plurality of modules, each of which connects into at least one of said interfaces, the plurality of modules having top plates that together form at least a portion of a deck or work surface. At least one of the modules is adapted to both weigh and image a sample. The robotic system can include one or more additional modules selected from the group consisting of a vortexing module, a heat and stir module, a wash station module, a reagent holder module and a heating module. The robotic system may have other features that are generally of a nature similar to those that have been described in the past, For example, the system may incorporate a plurality of pumps, such as syringe pumps.

The invention also provides a weigh and image module having a top plate with a door that opens and closes to reduce wind impact on measurements and allow for more accurate weight measurements. The weigh and image module includes a digital camera and optionally one or more lights below the top plate focused on the sample nest of a balance also located below said top plate. A diffuser surrounds the sample holder/nest on the balance and defining a sample chamber, and the diffuser can be colored and/or include a ruler to measure a sample property (such as color, settling, etc.). The weigh and image module includes a bottom platform attached to the top plate by a side support, with the bottom platform supporting the camera and balance, and being adapted to substantially isolate the balance from vibration.

One of the benefits of the combined weigh and image module is in the training of the robot for sample positioning on the balance. A user typically wants to repeatedly, accurately position a sample on the balance to ensure repeatability. However, because the balance is located below the deck (i.e., below the top plate), the camera can be used to position the sample to the correct location, which is then trained into the software for the robotic system. In this regard, the camera is used in a live image mode, with the user positioning the robotic arm with the gripped sample in the sample chamber on the balance nest using the camera live image view to position the sample. Once the position is identified, the robotic software trains that particular position that can be recalled during automated weighing protocols.

Looking at FIG. 1A, the robotic system comprises a frame 10 including a backplane 11, two frame sides 12 and a frame front 14. The system also includes one to three arms 16 (two are shown in FIG. 1), a backplane housing 18 and a deck 20. The backplane 11 provides structural support and guidance for the arms 16 to move left to right. Each arm 16 comprises at least one drive motor (not shown) to move itself along the backplane 11. Each arm 16 also comprises drive motors, controllers, and drivers for each axis of motion. Additionally each arm 16 includes an attachment points for each of the different resources that may be attached to an arm. The attachment point may be a standard interface on the end of its Z-rack to support a variety of standard robotic tools based on the required workflow. Examples of arm end resources include those selected from the group consisting of liquid handling, material handling, plate and vial moving, mixing heads and instrumented probing (e.g., temperature, pH, etc.).

The backplane housing 18 comprises interfaces and support (e.g., racks) for pumps or other ancillary electronic equipment needed for the workflow. Such interfaces and supports are typically for inexpensive, off-the-shelf syringe pumps, peristaltic pumps, switching valves, or any other electronic equipment for other parts of the robotic system (e.g., such as a heated tip on the robotic arm). An optional information display may be added to the back plane housing 18, allowing a user to monitor critical information such as temperature, stirring speed or other user defined variables. In circumstances where a dedicated computer is not used to run the robotic system, this optional display can function to provide the user information from the firmware.

Continuing with FIG. 1A, the parts of the frame 10 collectively support or define a deck 20. The deck 20 comprises an outline 22 that can be integral to the frame 10 or can be a separate piece that is attached to the frame in a manner knows to those of skill in the art (e.g., bolting, welding, etc.). The deck 20 provides a work area for the robot. The deck 20 comprises the outline 22 and at least one module top plate 32. FIG. 1A shows six module top plates 32 that fill the entire outline 22, however in some configurations only a portion of the deck 20 is filled with module top plates 32. In these configurations, for example, it is possible to incorporate a commercial device that extends below the deck 20 into or below the frame 10. The deck 20 is generally planar with specified locations for functional elements. FIG. 1A shows two types of modules having locations for functional elements accessible from the deck 20, including a weigh and image module 30 and a heated, stirrer module 26.

Figure 1B:
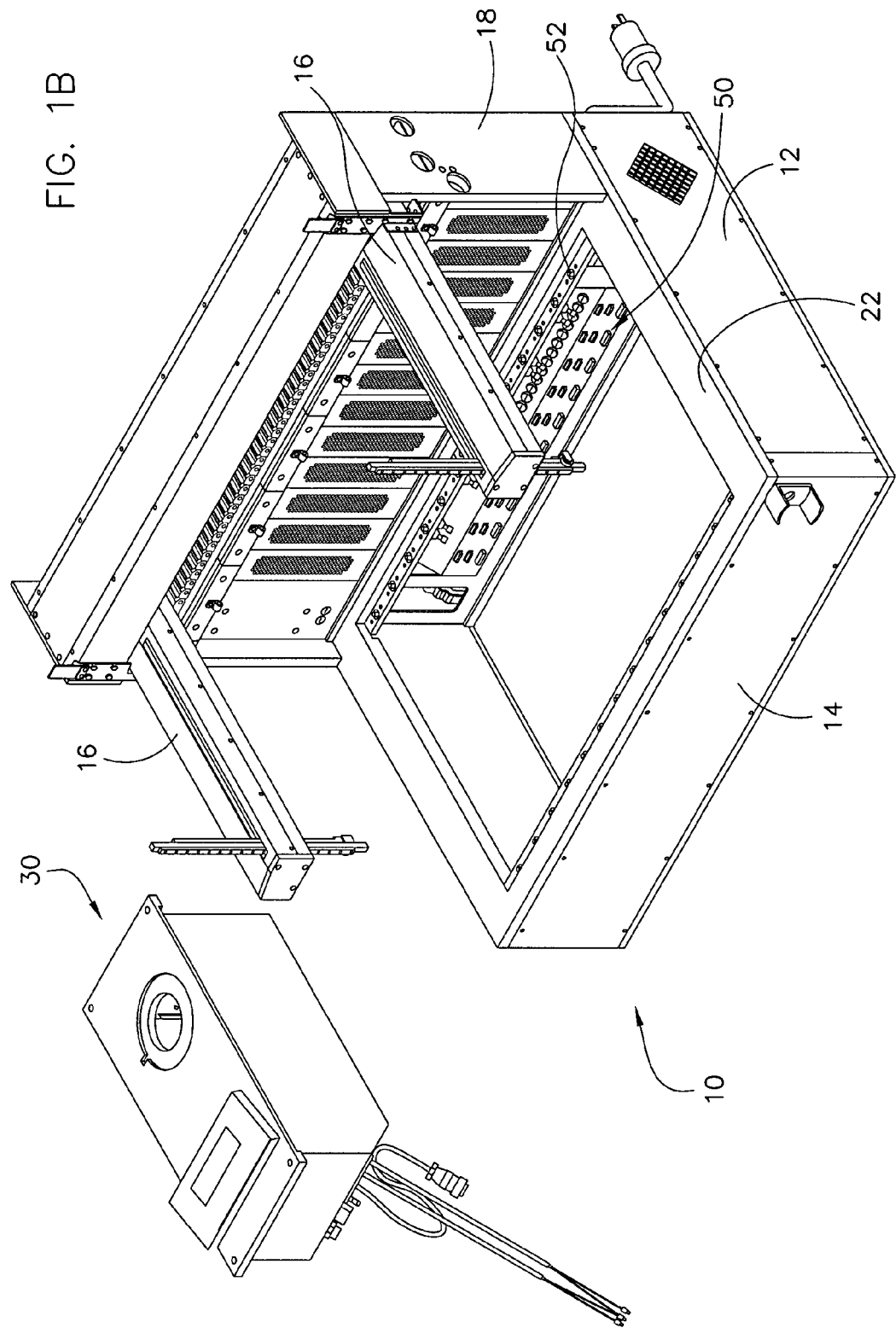

FIG. 1B shows an exploded view of the robot system with the weigh and image module 30 removed from the frame 10, clearly showing the deck outline 22. FIG. 1B also shows the lower portion of the backplane 11 that houses a plurality of interfaces 50. Each interface comprises a plurality of mechanical, electrical and communication ports to support the functional elements. Each interface also comprises includes a tooling pin 52 to accurately locate the module within the deck. The interfaces 50 are generally the same for each module, which allows for standard connections and thus flexibility in configurations of the robotic system (and deck). Each module may connect to one or more of the ports in the interface 50, but generally there are at least two connections for input and output of data or control commands. Also, each module may span one or more interfaces. In this regard, each module is a self contained assembly with its own control electronics (e.g., temperature control, over-temperature protection, motor control, etc.). Thus the modules typically require only power, pneumatic (if required) and communication connections, which are provided by the standard interfaces within the backplane. This stand-alone functionality also allows each module to be fully tested and qualified on the bench prior to being installed in the robotic system. Each module is designed based on a standard unit width with the standard robotic deck having room for between 8 and 36, and more specifically between 10 and 30 units total and even more specifically between 10 and 20 units. For example, an element for the heating and stirring of microtiter plates has a width of 2 units and a weigh and image element has a 4 unit width. Although one could design these modules to occupy different unit widths, typically the number of units per module is kept to a minimum in order to maximize robot system space and utility.

For example, as shown in FIG. 1B, the weigh and image module 30 spans two interfaces when inserted into the deck 20, as shown in FIG. 1A. The number of interfaces is not critical, and in some aspects, the number of interfaces is at least 5, more specifically at least 10 and even more specifically at least 15 interfaces are associated with the backplane. The choice of ports for each interface reflects the design for flexibility, including one or more communication ports utilizing, for example, RS232 and RS485 connections. Power or other electrical outlets are also provided, including for example. 208 VAC, 48 VDC and 24 VDC. In some embodiments, connection ports are provided that are not part a standard interface grouping, which allows for fewer of these types of connections for cost savings. In general these connections are not needed in most robotic system configurations. For example, between 2 and 7 USB connections may be provided for use across all modules. Also for example, between 3 and 18 channels of digital I/O are provided for use across all modules. No matter what specific ports are used in each configuration, in general standard interfaces are used for module electrical, communication and other connections to the robotic system control system.

FIG. 1C shows the robotic system of the invention where the frame 10 comprises a base 120 adapted to receive a plurality of modules 21, with each module having a top plate 5 that combine together to form a deck 20 (or work surface). The arms 16 of the robotic system are supported by a framework extending from the base 120 by legs 25A connected by rail 25B on which the arms move by techniques known to those of skill in the art. The plurality of interfaces is associated with the frame (not shown). The deck 20 comprises the top plates from the modules. FIG. 1C also shows pumps, such as standard syringe pumps known to those of skill in the art.

Figure 2:
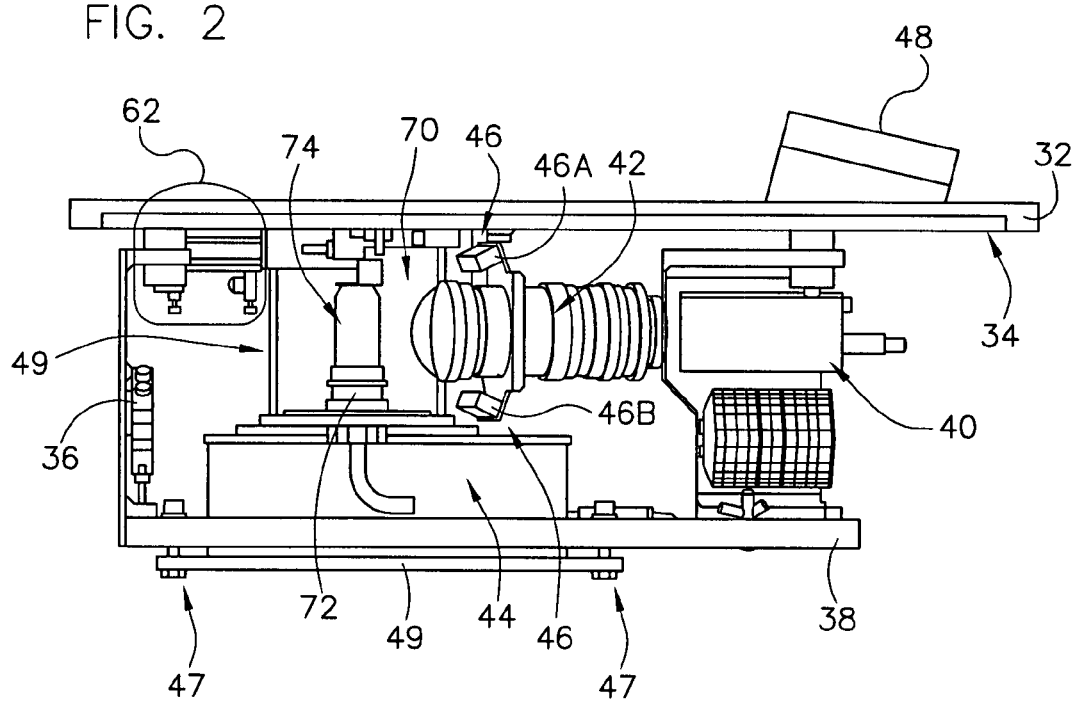
FIG. 2 is a cutaway drawing of the weighing and imaging module.

Looking specifically at the modules that are attached to the robotic system, a weigh and image module 30 is shown in FIG. 2. The module 30 can comprise a top plate 32 that supports the module 30 from the deck outline 22. The top plate has holes 34 for location interfacing with the tooling pins 52 to provide accurate location of the module 30 in the deck. The standard locations identified by the tooling pins in the deck 20 allow for easier programming of the robotic arms 16 to locate the elements on the deck. The module 30 can also comprise a bottom plate (not shown) that supports the module 30 from the base 120. Module 30 has a side support 36 attached to the top plate 32 using a convenient attachment device such as a bolt and nut. FIG. 2 shows attachment of the side support 36 to the top plate 32 as part of the draft door 60 opening and closing mechanism 62. The side support 36 is attached to a lower platform 38.

A camera 40 is mounted on the lower platform 38 having a lens 42 focused in the direction of the sample chamber 70, which comprises sample 74. The camera is typically a charged coupled device (e.g., a digital camera) for high resolution picture and/or video capture. For example, a Mutech Corp. P/N PC-1280/C or a Phoenix PC-1280 USB which has a resolution of 1280-1024 may be used. The lens typically has a deep enough depth of field to accommodate a range of sample sizes, but an autofocus lens with desired zooming capability appropriate to focus on the samples in the chamber can also be used. For example, a ZOOM, TOYO OPTICS, 12.5-75 MM lens may be used. Associated with the camera 40 and lens 42 are lights 46, with two lights 46 being shown in FIG. 2. There can be as many lights as needed, depending on their power, as well as the sample chamber diffuser 49 (described below). Also attached to the lower platform 38 is a balance 44 that is attached to a vibration dampening support 49 secured to the bottom platform 38 with vibration dampening supports 47. The vibration dampening support 47 can comprise mechanisms known to those of skill in the art, such as a bolt and nut with rubber dampeners, springs or other vibration reduction or elimination mechanisms. The balance can be of any OEM generally available with sufficient accuracy to measure the samples. For example, a Sartorius Corporation P/N WZ65-CW OEM balance may be used or an OEM balance available from Mettler-Toledo may be used. Not shown in FIG. 2 are the connections for the module 30 to connect into the interface 50, however connections that are typical for module 30 comprise a power connector (24+V, 24V return, and chassis ground), digital I/O's for the upper LED lamp 46A, digital I/O for the lower LED lamp 46B, digital I/O for the door open/close valve, digital I/O for the door position sensor, USB 2.0 communication and power for the camera, RS232 serial communication for the weigh cell, pneumatic connection, for the door air cylinder, and a drain line for any spilled liquids.

As shown in FIG. 2, the balance 44 has a sample holder or nest 72 that supports a sample 74 inside the sample chamber 70. The outside of the sample chamber is defined by a diffuser 49 that has at least two functions, one being to diffuse light from the lights 46 when shining on a sample 74 on the sample holder 72. The other function of diffuser 49 is to shield the balance holder from any air drafts to increase the accuracy of the weight measurement. The diffuser could also be fitted to the camera lens and or lights using one or more holes or fitted openings. The diffuser can be any color, such as white or may have no color or may be part colored and part clear (e.g., half colored and half clear with the clear portion being on the side of the camera lens). Additional possible functionality of the diffuser 49 includes different colors to provide a desirable contrast to the samples and/or a ruler, color scale or other visible measurement capability viewable by the camera lens. For example a ruler can be used as a metric for settling of formulations or solutions over time.

Figure 3:
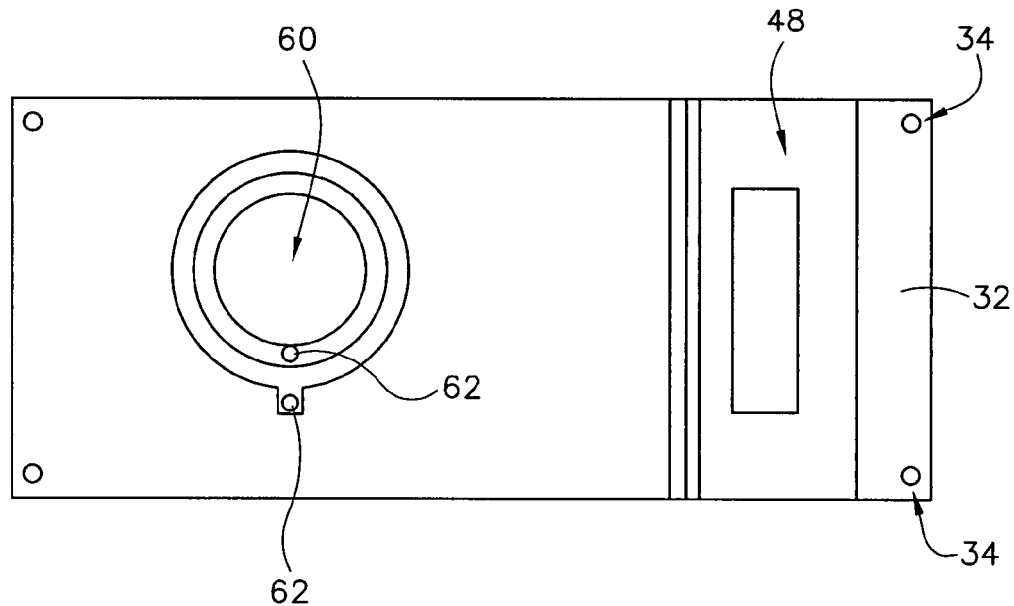
FIG. 3 is a top view of the weighing and imaging module.

FIG. 3 shows a top view of weigh and image module 30, including the draft door 60 and display 48. The display 48 is typically connected to the scale 44 and shows sample weight in real time, as well as other typical displays for a scale. The display also has some functionality, such as the ability to tare the balance, set scale and clear faults. The draft door 60 operates by sliding open and shut allowing for sample insertion and removal, but also accurate weighing with the door closed defining the top of the sample chamber 70. The draft door 60 is recessed as compared to the top plate 32, and drains 62 allow for any liquids spilled on the top plate to be drained away from the sample chamber as well as protecting the electronics and camera from damage. The drains 62 can be plumbed to a common liquid waste.

Figure 4:
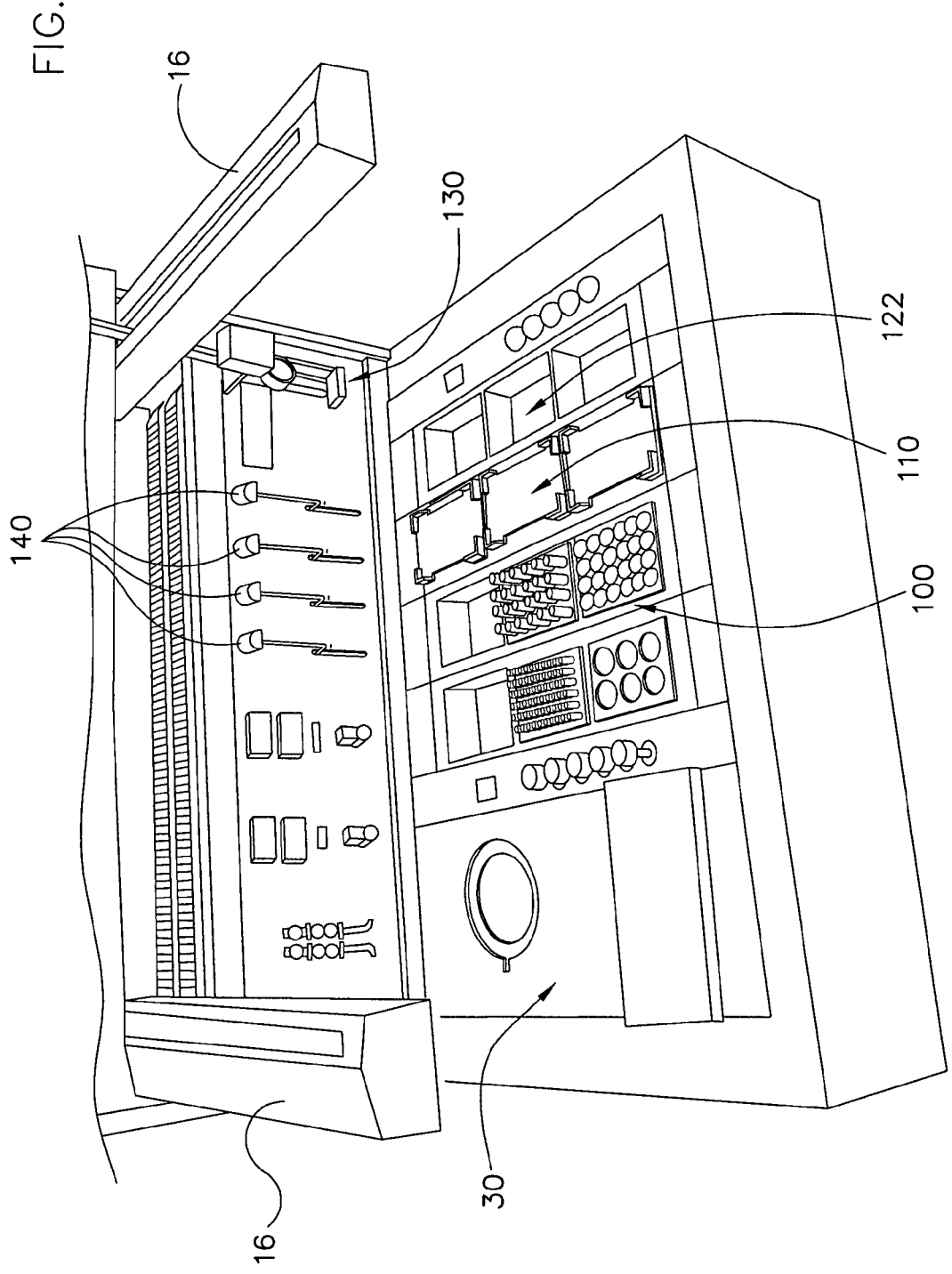
FIG. 4 is shows a certain configuration of the robot platform including a number of different modules.

Another module is a heated and stirred module having the ability to heat 3 microtiter plates up to 200° C. and magnetically stir liquid samples in each well of the microtiter plate at speeds of up to 750 RPM. This module comprises an independent over-temperature control circuit to disconnect power in the event of an anomalous thermocouple reading or component failure. Other modules for the deck include a 0.01 mg resolution balance, a vortex stirrer, a vertical shaker for powder mixing, and several different types of standard wash stations. FIG. 4 shows a configuration of the robotic system having a number of different modules that comprise the deck. Specifically, FIG. 4 shows a weigh and image module 30, two heating modules 100 (shown with different types of microtiter plates in the heated areas), a vortex module 110 (which shakes microtiter plates to vortex samples) and a heated and stirrer module 122. FIG. 4 also shows certain configurations on the arms 16, including a heated tip (to maintain samples at a desired temperature during transfer) and a vial gripper 130. FIG. 4 also shows syringe pumps 140 located in the back plane.

Users control the robotic system using a robotic control system, which typically includes software for both protocol development and execution. Software useful in the robotic control system is Renaissance Impressionist® and Epoch® software, available from Symyx Technologies, Inc. (Santa Clara, Calif.). Renaissance Impressionist® Software is a general laboratory automation package for creating and executing laboratory procedures. Epoch typically records log files, and writes data from the balance, the camera, and any pH or conductivity probes back to the database. Each module of the robotic system will include an Impressionist software resource which defines the underlying communications protocols for each device contained within a particular module. For example, the weigh and image module has resources for camera, the weigh cell, and you define each of the digital inputs/outputs (I/O) points for the each of the connections (as described above). Also for example, the heated and stirring module has resources for a stir motor controller, heater controller and over temperature controller. Configuring Impressionist for a specific module configuration is accomplished by selecting those resources that correspond to the hardware devices connected to the interfaces. This approach allows devices of the same type (e.g., Watlow temperature controller or an Omega Temperature controller) to be used interchangeably by user procedures even if the underlying communications protocols are different. Renaissance Impressionist currently supports over 140 resources that manage communications with individual hardware devices. In addition, users can extend capabilities to new modules by using the Impressionist Developer's Kit, which allows users to develop their own custom resources to be used with any proprietary or custom modules.

FIG. 5 is a screenshot of typical data that comes from the weigh and image module. Specifically, shown therein is a spreadsheet 200 showing the results of a sample that has been weighed, with the sample identification 210, the date and time of weighing 220, the weight 230 and an image 240 of the sample. Additional information 250 regarding the sample from the application server is also shown.

The robotic system is designed to be the central enabling technology of many different workflows. One method of using the robotic system is in a liquid formation workflow, which accelerates the process of making solubility measurements in addition to preparing and testing liquid formulations, starting from either solid forms or solutions of active pharmaceuticals and intermediates. Robotic activities include dispensing solvents and buffers, measuring or adjusting the pH, heating, cooling, stirring and filtering samples, and making serial dilutions for subsequent chromatography measurements.

In one method of using the system, components of liquid formulations to be prepared are identified using a library design package, such as Library Studio (available from Symyx Technologies, Inc., Santa Clara, Calif.) or design of experiments software or other means. The design is not critical to this invention. The user defines the resources available to the robotic system (such as the number of arms, syringe pumps, vial grippers, plate grippers, temperature modules, vortexers, heaters stirrers, etc.). As part of defining the resources, a user will also specify a communication channel for each resource, so that the robot control system will know which signals to trigger the desired action; in other words, each resource will have a specified software address. The user will also typically train each available robotic arm to a reference position, which is an X-Y-Z space within the workspace and can be a point on the deck (such as a screw location). The reference position allows the user to identify any substrate relative to the reference point, which then provides the substrate reference to all available arms and resources. The user will then define the physical locations on the deck or in the range of the robotic arms. The locations are typically defined as an array or an individual vial. A user typically will manually train individual locations of each substrate, which can be retained for repeated use (such as source vial locations, destination vial locations, wash stations, balance location, etc.). For the weigh and image module, the sample nest is trained (as described above), but also the image capture parameters are set by setting aperture, color balance and light intensity (e.g., should one light or two lights should be on during image capture). Once the desired formulations are identified or conceived, the source materials are typically set on the deck in specified locations and a destination array of individual vials are set on the deck at a designated location, known to the software and user. An Impressionist/Epoch dispense protocol is used to recall the recipe and in this example, the first component is dispensed according to the recipe. After all the dispenses, the robot system then tares the balance, picks up a sample vial using a vial gripper tool, opens the draft door, moves the vial to the balance nest, opens the grippers, retracts the arm and closes the draft door. The software waits for a stable weight, during which time the image is captured by the lights activating and the camera recording the image to the database. In another example, an aliquot of a suspension formulation is taken from an array into a second array. The weight of each aliquot is taken and an image is taken at a first time. The array of aliquots is processed as desired, such as waiting for a period of time to allow for settling or heating or other processing. The aliquots are weighed and imaged again to look for mass loss due to evaporation and changes in the formulation.

A number of embodiments of the invention have been described. Nevertheless, it will be understood that various modifications may be made without departing from the spirit and scope of the invention.

What is claimed is:

1. A robotic system, comprising:
a) a frame,
b) a plurality of interfaces, wherein at least two of said interfaces are substantially identical to one another, and
c) a plurality of modules supported by the frame, each of the modules connecting into at least one of said interfaces, the plurality of modules having top plates that together form a work surface,
wherein at least one of said modules is a weigh and image module adapted to weigh and image a sample.

2. The system of claim 1, wherein said weigh and image module comprises a top plate having a door therethrough, the door being adapted to open and close.

3. The system of claim 2, wherein said weigh and image module comprises a camera and one or more lights below said top plate.

4. The system of claim 2, wherein said weigh and image module comprises a balance located below said top plate, the balance having a sample holder below the door.

5. The system of claim 4, wherein said weigh and image module further comprises a diffuser surrounding the sample holder and defining a sample chamber.

6. The system of claim 5, wherein the diffuser is a color other than white.

7. The system of claim 4, further comprising a bottom platform supporting said camera and said balance, the bottom platform being adapted to substantially isolate said balance from vibration.

8. The system of claim 1, wherein said plurality of modules comprises modules selected from the group consisting of a vortexing module, a heat and stir module, a wash station module, a reagent holder module and a heating module.

9. The system of claim 1, wherein each of said interfaces comprises a communication port and a power port.

10. The system of claim 9, further comprising additional connection ports associated with the frame selected from the group consisting of USB connections and digital input/output connections.

11. A module for automated weighing and imaging of a sample, the module comprising
a top plate, bottom platform and side supports connecting the top plate and bottom platform, the top plate having a door;

a sample chamber located beneath the door, the sample chamber comprising a diffuser;

a balance on the bottom platform;

a sample holder positioned on the balance directly below the door, the sample holder defining the bottom of the sample chamber; and a digital camera with a lens focused on a sample held by the sample holder positioned on the balance directly below the door.

12. The module of claim 11, wherein the balance is attached to the bottom platform with balance attachments that substantially isolate the balance from vibration.

13. The module of claim 11 additionally comprising one or more lights for illuminating a sample in the sample chamber.

14. The module of claim 11 additionally comprising a display on the top plate for displaying balance attributes.

15. The module of claim 11, wherein the diffuser defines the sample chamber and shields the sample holder from air drafts.

16. The system of claim 1 wherein the weigh and image module comprises a balance operable to weigh a sample when the sample is on the balance, the system being adapted to image the sample while the sample is on the balance.

17. The system of claim 16 further comprising a robot arm adapted to place a sample on the balance.

18. The system of claim 17 wherein the frame has an upright portion, the upright portion supporting the robot arm above the work surface.

19. The system of claim 1 wherein the top plates of the modules have edges and at least some of the edges are in abutting relation to one another.

20. A module as set forth in claim 11 wherein the module is adapted to image a sample while the sample is supported by the balance platform.

21. A robotic system comprising:

a frame;

a plurality of modules supported by the frame, wherein at least one of the modules is a weigh and image module adapted to weigh and image a sample;

locators supported by the frame, the locators being engageable with the modules for accurately locating the modules relative to the frame;

a robot supported by the frame and movable with respect to the modules;

a housing supported by the frame and housing electronic equipment; and interfaces on the housing for interfacing with the electronic equipment, the modules being connected to respective interfaces;

wherein the top plates form a substantially continuous work surface.

22. The system of claim 21 wherein the interfaces are arranged in side-by-side relation to one another and at least two of the interfaces are substantially identical to one another.

23. The system of claim 21 wherein the weigh and image module comprises a balance for weighing samples and the robot is adapted to place a sample on the balance.

24. The module of claim 11 wherein the balance and camera are both mounted on the bottom platform.

25. The module of claim 11 wherein the door is recessed into the top plate.

* * * * *